No. 885,272. PATENTED APR. 21, 1908.
F. B. MELVILLE.
EDUCATIONAL APPLIANCE.
APPLICATION FILED JULY 8, 1907.

Witnesses:
George Felber
J O King

Inventor:
Francis B. Melville
By Oliphant & Young
Attorneys.

UNITED STATES PATENT OFFICE.

FRANCIS B. MELVILLE, OF MILWAUKEE, WISCONSIN, ASSIGNOR OF ONE-HALF TO LOUIS DRALLE, OF MILWAUKEE, WISCONSIN.

EDUCATIONAL APPLIANCE.

No. 885,272.  Specification of Letters Patent.  Patented April 21, 1908.

Application filed July 8, 1907. Serial No. 382,815.

*To all whom it may concern:*

Be it known that I, FRANCIS B. MELVILLE, a citizen of the United States, and resident of Milwaukee, in the county of Milwaukee and State of Wisconsin, have invented certain new and useful Improvements in Educational Appliances; and I do hereby declare that the following is a full, clear, and exact description thereof.

The invention consists in what is herein shown, described and claimed; its object being to provide simple, economical, compact and interesting educational appliances particularly designed for the advertising and souvenir trade.

Figure 3:
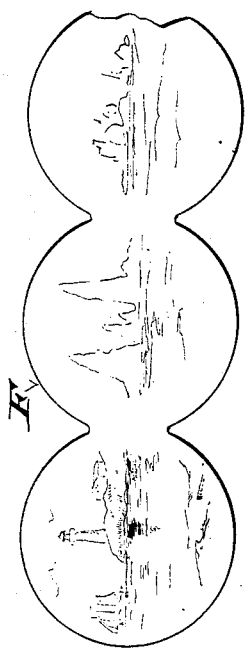
Figure 2:
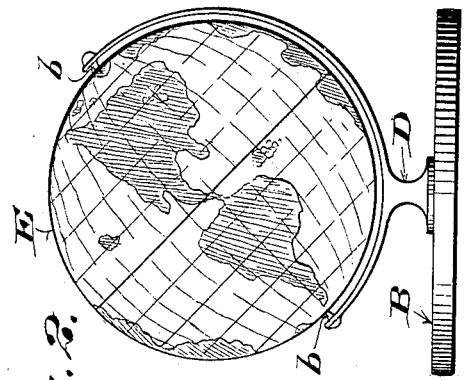
Figure 1:
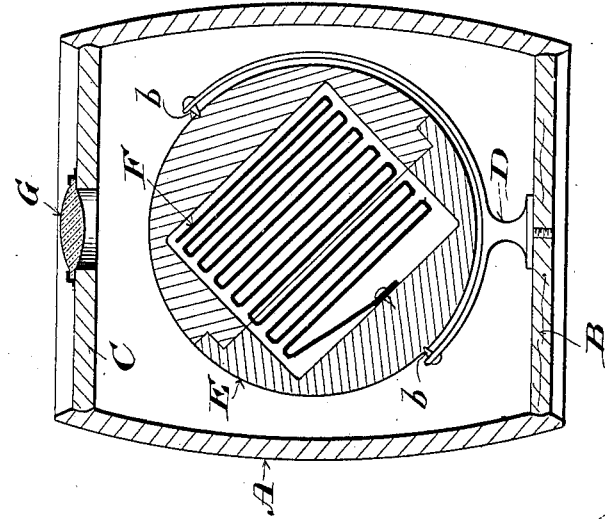

Figure 1 of the accompanying drawings represents a sectional view of a receptacle and a separable globe therein, a detachable closure of the receptacle serving as a base for a stand that supports the globe, Fig. 2, an elevation of the globe, stand and base aforesaid, and Fig. 3, a fragment of a folding album for which said globe serves as a casing.

Referring by letter to the drawings, A indicates a receptacle, herein shown as a simulation of a barrel having removable heads B, C, but it may be of any preferred form having at least one removable closure for the purpose hereinafter specified. The heads or closures B, C, herein shown have snap-fit in annular grooves of the receptacle, but means for the support and retention of said heads or closures in connection with said receptacle may be indefinitely varied in practice.

The head or closure B constitutes a base for a stand D, and spring-branches of said stand are provided with pivot-points *b* engageable with a preferably terrestrial globe E at the poles of same, the globe being hollow and parted at the equator to serve as a casing for a folding pictorial album F or anything else, one end of the album being preferably fastened to a hemisphere of said globe. The album is intended as a means for the dissemination of geographical, historical or other information. The other head or closure C of the receptacle A is herein shown provided with a central aperture, and fastened to said head or closure in register with said aperture is a magnifying lens G by which to better observe portions of the globe or album aforesaid when the same are exposed outside of said receptacle.

The receptacle, globe and album may serve as vehicles for advertising matter, and the assemblage as a whole constitutes a novel, attractive and educational souvenir to which the catch phrase: "The earth barreled up" applies.

I claim:

1. An educational appliance comprising a receptacle having a removable closure, a stand for which the closure constitutes a base, and a globe in conjunction with the stand.

2. An educational appliance comprising a receptacle having a removable closure, a stand for which the closure constitutes a base, and a hollow separable globe in conjunction with the stand.

3. An educational appliance comprising a receptacle having a removable closure, a stand for which the closure constitutes a base, a hollow separable globe in conjunction with the stand, and a folding album for which said globe constitutes a casing.

4. An educational appliance comprising a receptacle having an aperture at one end, a magnifying lens closing the aperture, a removable closure opposite the lens, a stand for which the closure constitutes a base, and a globe in conjunction with the stand.

5. An educational appliance comprising a receptacle having opposite detachable closures, a magnifying lens set in connection with one of the closures, a stand for which the other closure constitutes a base, and a globe in conjunction with the stand.

In testimony that I claim the foregoing I have hereunto set my hand at Milwaukee in the county of Milwaukee and State of Wisconsin in the presence of two witnesses.

FRANCIS B. MELVILLE.

Witnesses:
 N. E. OLIPHANT,
 GEORGE FELBER.